US010929125B2

(12) United States Patent
van Schaik (10) Patent No.: US 10,929,125 B2
(45) Date of Patent: Feb. 23, 2021

(54) DETERMINING PROVENANCE OF FILES IN SOURCE CODE PROJECTS

(71) Applicant: Microsoft Technology Licensing, LLC, Redmond, WA (US)

(72) Inventor: Sebastiaan Johannes van Schaik, Oxford (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/229,773

(22) Filed: Dec. 21, 2018

(65) Prior Publication Data

US 2019/0205125 A1    Jul. 4, 2019

Related U.S. Application Data

(60) Provisional application No. 62/611,450, filed on Dec. 28, 2017.

(51) Int. Cl.
| | | |
|---|---|---|
| *G06F 9/44* | (2018.01) | |
| *G06F 8/75* | (2018.01) | |
| *G06F 8/36* | (2018.01) | |
| *G06F 8/77* | (2018.01) | |

(52) U.S. Cl.
CPC .............. *G06F 8/751* (2013.01); *G06F 8/36* (2013.01); *G06F 8/75* (2013.01); *G06F 8/77* (2013.01)

(58) Field of Classification Search
CPC ... G06F 8/36; G06F 8/75; G06F 8/751; G06F 8/77

USPC ................... 717/120–122, 168–173
See application file for complete search history.

(56) References Cited

U.S. PATENT DOCUMENTS

| | | | |
|---|---|---|---|
| 7,610,545 B2 | 10/2009 | Wagner et al. | |
| 8,635,584 B2 | 1/2014 | Jones et al. | |
| 9,069,808 B2 | 6/2015 | Kementsietsidis et al. | |
| 9,282,013 B2 | 3/2016 | Castro et al. | |
| 9,471,354 B1 | 10/2016 | Schweitzer | |
| 9,792,114 B1 * | 10/2017 | Schaefer | G06F 8/71 |
| 10,162,629 B1 * | 12/2018 | Churchill | G06F 8/74 |

(Continued)

OTHER PUBLICATIONS

Davies et al., "Software Bertillonage—Determining the provenance of software development artifacts", 2013, Springer, pp. 1195-1237 (Year: 2012).*

(Continued)

*Primary Examiner* — Ted T. Vo
(74) *Attorney, Agent, or Firm* — Workman Nydegger (57) ABSTRACT

Methods, systems, and apparatus, including computer programs encoded on computer storage media, for determining the provenance of source code. One of the methods includes receiving a portion of a file occurring in a source code project. For each of a plurality of windows of characters in the portion of the file, a respective provenance signature is computed. An index that maps each provenance signature to occurrences of the provenance signature in one or more files of a plurality of projects is searched to identify one or more matching files that are each associated with at least one provenance signature computed for the portion of the file. Data identifying the one or more matching files is provided in response to receiving the portion of the file occurring in the source code project.

22 Claims, 6 Drawing Sheets

(56) References Cited

U.S. PATENT DOCUMENTS

| | | | |
|---|---|---|---|
| 10,176,331 B2 | 1/2019 | Sheehan et al. | |
| 10,353,702 B2* | 7/2019 | Schaefer | G06F 8/71 |
| 2008/0281915 A1* | 11/2008 | Elad | G06Q 10/10 |
| | | | 709/204 |
| 2012/0144067 A1 | 6/2012 | Buckley | |
| 2013/0031371 A1 | 1/2013 | McLellan | |
| 2013/0132138 A1 | 5/2013 | Doganata et al. | |
| 2018/0248701 A1* | 8/2018 | Johnson | H04L 9/3247 |

OTHER PUBLICATIONS

Michael W. Godfrey, "Understandingsoftwareartifactprovenance", 2013, Elsevier B.V., pp. 86-90 (Year: 2013).*

Di Penta et al., "Identifying Licensing of Jar Archives using a Code-Search Approach", 2006, from Eclipsedesktop.org, 10 pages (Year: 2006).*

Gerhards et al., "A History-tracing XML-based Provenance Framework for Workflows", 2010, WORKS 10 Submission 3, 10 pages (Year: 2010).*

\* cited by examiner

DETERMINING PROVENANCE OF FILES IN SOURCE CODE PROJECTS

CROSS-REFERENCE TO RELATED APPLICATION

This application claims benefit of priority to U.S. Application No. 62/611,450, filed on Dec. 28, 2017, the entire contents of which are herein incorporated by reference.

BACKGROUND

This specification relates to static analysis of computer software source code.

Static analysis refers to techniques for analyzing computer software source code without executing the source code as a computer software program.

A software project, or for brevity, a "project," is a code base having a collection of source code files. A project generally organizes the collection of source code files in a particular way, e.g., in a hierarchical directory structure, with each source code file in the project having a respective path. Typically, the source code files in a project provide one or more related functionalities.

Source code in a project is typically maintained by developers using a version control system. Version control systems generally maintain multiple revisions of the source code in the code base, each revision being referred to as a snapshot. Each snapshot includes the source code of files of the code base as the files existed at a particular point in time.

Snapshots stored in a version control system can be represented as a directed, acyclical revision graph. Each node in the revision graph represents a commit of the source code. A commit represents a snapshot as well as other pertinent information about the snapshot such as the author of the snapshot, and data about ancestor commits of the node in the revision graph. A directed edge from a first node to a second node in the revision graph indicates that a commit represented by the first node is a previous commit than a commit represented by the second node, and that no intervening commits exist in the version control system.

Determining the origins of source code in a project is a notoriously difficult problem. Source code files have many different versions and get reused by many different people in many different projects. Developers often copy and rename source code files or move them into unexpected locations. Further compounding the problem is that some portions of multiple source code files can be copied into a single source code file in another project.

SUMMARY

This specification describes how a system can determine the provenance of a file or smaller portions thereof. Determining the provenance of a file can include determining whether or not the file has been seen elsewhere as well as determining the origins of the file.

Particular embodiments of the subject matter described in this specification can be implemented so as to realize one or more of the following advantages. Using a searchable file provenance database allows a system to determine the true origins of a file (or a part thereof), regardless of how many times the file has been edited, copied, renamed, or moved. Analyzing multiple heterogeneous projects allows a robust file provenance database to be constructed. The file provenance information can be used for a variety of previously impossible applications for a file of otherwise unknown origin, including locating a canonical source of a source code file, identifying a most likely version of the source code file, classifying the file as library code, proactively identifying updates or vulnerabilities of to the source code file, and more precise attribution of performance metrics. In addition, the file provenance database can be used for adoption analysis in which all project that have imported code from a particular project can be easily identified. The file provenance data can also be used to perform technology inventory analysis. For example, after determining a canonical source of files in a project and classifying some of those files as library code, a system can automatically determine which other projects the project actually depends on. Note that is true even if the code was copied in whole from the other projects.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for determining the provenance of source code and related applications for using such information. Determining the provenance of source code relates to questions about whether or not a particular piece of source code has been seen before in other projects. In some cases, this involves determining one or more possible origins of the source code.

Many software projects use library code, which is source code that is imported or copied from another project. When analyzing a software project, it can be quite useful to distinguish between code that was written by developers of the software project and code that was written elsewhere and copied in. In one particular application, determining the actual origin of a piece of software can be used to improve the accuracy of attributing of software development contributions. For example, if a developer who writes a module from scratch should naturally get more credit than another developer who merely copies code from another project. Conversely, a developer who copies code from another project should not get blamed for all the flaws in the copied code.

Figure 1:
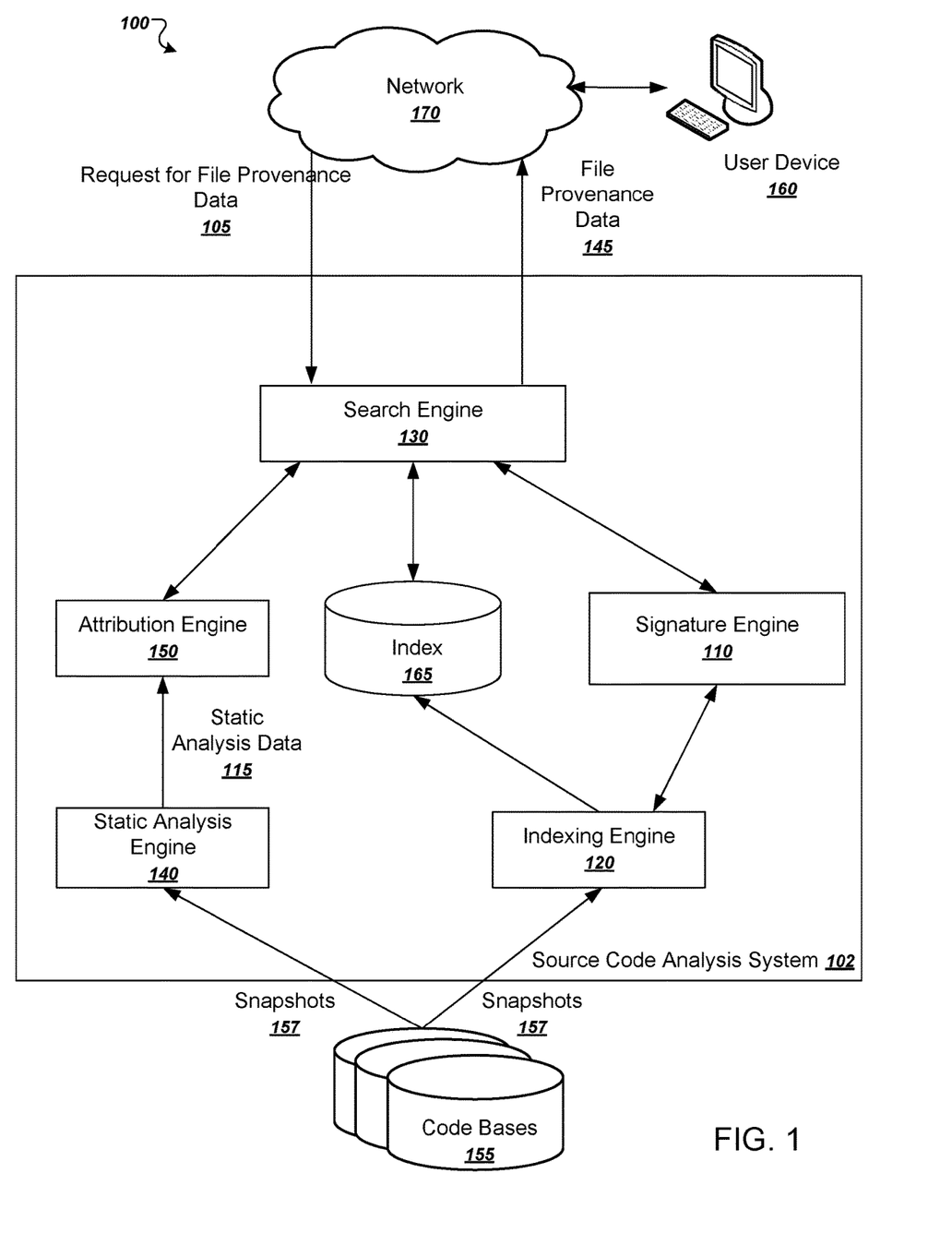
FIG. 1 is a diagram that illustrates an example system.

FIG. 1 is a diagram that illustrates an example system 100. The system 100 includes a user device 160 in communication with a source code analysis system 102 over a network 170. The source code analysis system 102 includes several functional components, including a signature engine 110, an indexing engine 120, a search engine 130, a static analysis engine, and an attribution engine 150. The components of the source code analysis system 102 can be implemented as computer programs installed on one or more computers in one or more locations that are coupled to each other through a network 170, which can be any appropriate communications network, e.g., an intranet or the Internet. Alternatively, the source code analysis system 102 can be installed in whole or in part on the user device 160.

A user of user device 160 can provide to the source code analysis system 102 a request for file provenance data 105. The request 105 can specify one or more portions of one or more files of one or more snapshots of one or more code bases 155 for analysis. The request 105 can specify the location of a file occurring in one of the code bases 155. Alternatively, the request 105 can upload a file or can provide another location of a file, e.g., a uniform resource locator (URL) of the file.

Upon receiving the request 105, the search engine 130 can search an index 155 to determine whether or not the source code file of the request 105 has been previously observed in the code bases 155. To perform the search, the search engine 130 can use a signature engine 110 to obtain a plurality of file provenance signatures from text of the source code file.

The signature engine 110 can generate, from a given source code file, a plurality of file provenance signatures. This process is described in more detail below with reference to FIG. 2.

The search engine 130 can receive the file provenance signatures from the signature engine 110 and search the index 165 using the file provenance signatures. The search engine 130 can then provide a response that includes file provenance data 145 about the source code file. The file provenance data 145 can include, for example, an indication of whether or not the source code file has been seen in any of the code bases 155. If the source code file belongs to one of the code bases 155, the file provenance data 145 can also include an indication of whether or not the source code file should be considered library code because it was copied from another source within the code bases 155. Searching the index 155 with file provenance signatures is described in more detail below with reference to FIG. 5.

An indexing engine 120 can generate the index 165 using snapshots 157 stored in the code bases 155. For each source code file touched by each of the snapshot 157, the indexing engine 120 can use the signature engine 110 to generate file provenance signatures. The indexing engine 120 can then use the generated file provenance signatures to populate the index 165. Generating the index using file provenance signatures is described in more detail below with reference to FIG. 4.

A source code analysis system 102 can analyze many thousands of heterogeneous projects in the code bases 155, which can be projects written by different people working for different organizations and in different programming languages. Therefore, analyzing such a robust dataset allows the system 102 to build a very robust file provenance index. In other words, if a source code file has been copied from any of the thousands of projects, there is a very high likelihood that the system will be able to use the file provenance index to figure out from where the file was copied.

File provenance data can be used for a variety of interesting applications. One such application is to affect that attribution of developer contributions to a source code base. A static analysis engine 140 can analyze the snapshots 157 to generate static analysis data 115. The static analysis data 115 can identify a number of properties of the snapshots 157, including characteristic segments or source code, e.g., source code violations; as well as a variety of source code metrics, e.g., net new lines of code added in that snapshot.

An attribution engine 150 can receive the static analysis data 115 and attribute the static analysis data 115 to a particular responsible developer entity that committed the snapshot. A developer entity can be a single developer or a group of multiple developers. For example, a developer entity can be developers on a team, developers within a department of an organization, developers within a company, or any other appropriate group of developers.

The attribution engine 150 can improve the accuracy of the attribution process by using file provenance data. To do so, the attribution engine 150 can use the search engine 130 to determine whether, for each potentially attributable file, whether or not the source code file has been observed elsewhere in the code bases 155. If so, the attribution engine can take an appropriate corrective action, e.g., by excluding the file from the attribution process or by only counting portions of the source code file that were actually contributed by the responsible developer entity.

Figure 2:
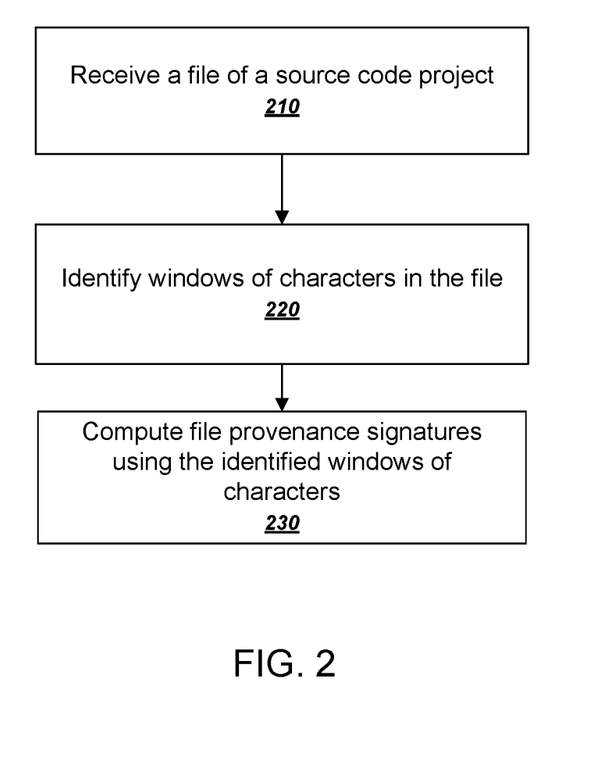
FIG. 2 is a flowchart of an example process for computing file provenance signatures for a file.

FIG. 2 is a flowchart of an example process for computing file provenance signatures for a file. The process will be described as being performed by an appropriately programmed system of one or more computers, e.g., the signature engine 110 of FIG. 1.

The system receives a file of a source code project (210). As described above, the file can be specified as part of an indexing process for building a file provenance index or as part of a searching process for searching the file provenance index. In this specification, where reference is made to receiving or processing a "file," the file can be all or merely a portion, e.g., a proper subset, of a file as it exists in a source code base. In other words, the techniques described in this specification can be used on portions of files rather than full files of a source code base.

In addition, although this specification makes reference to the file occurring in a source code base, the file itself need not be a source code file. For example, the file can be a configuration file, e.g., written in XML, license files, README files, and documentation files, to name just a few examples.

The system identifies windows of characters in the file (220). Each window defines characters from which a provenance signature will be generated. The system can use any appropriate window definition. For example, each window can be defined by the entire file, can be defined by an offset from the start or end of the file, can be defined by character offsets, can be defined to have random sizes and locations, or can be defined by source code segments, e.g., from the start of every function, class, or "if" block, to name just a few examples.

In some implementations, the system defines the windows of characters using particular character offsets from anchor characters. In this specification, an anchor character is a specially reserved source code character, e.g., "s", "#", "f", "p", "l", or ".", to name just a few examples. The system can use any appropriate source code character as an anchor character and can use one anchor character or multiple anchor characters. In general, anchor characters provide better performance when they have a sufficiently uniform distribution in files across projects and across languages.

Using anchor characters can ensure that even in the face of small changes to a file, some windows of characters will remain the same. For example, if a developer adds a comment to the top of a source code file, the anchor characters and the resulting windows will remain the same.

The system can define each window of characters as a sequence of N characters in the file starting at, ending at, or containing the anchor character at a particular position. The system can use any appropriate value of N, e.g., 10, 50, 100, or 500 characters.

In using anchor characters to define the windows, the density of windows throughout the file can vary. For example, a single line can have multiple anchor characters and can thus define multiple windows for the single line. For example, if the character "i" is used as an anchor character, the following line of source code defines four separate windows: "for (int i=1; i<3; i++)". The differing window densities themselves can then emerge as a characteristic feature of the file. Therefore, even if an anchor character has a substantially uniform distribution throughout files in a project, the different window densities will become a characteristic feature of the file, which is information that is represented by the provenance signatures computed from each window.

The system can include or exclude the anchor character in each window. Alternatively or in addition, the system can ignore comments, whitespace, or both when defining each window of characters. Alternatively or in addition, the system can use only subsets of characters for each window of characters. For example, the system can use only letters and exclude numbers or other special characters.

The system computes file provenance signatures using the identified windows of characters (230). The system can compute each file provenance signature by using each window of characters as input to an appropriate content-based signature function. At a minimum, the signature function should generate the same file provenance signature for two identical windows of characters. The signature function can also be a function that generates a fixed size output for any arbitrarily sized input. For example, in some implementations, the signature function is a content-based hashing function and the provenance signatures are hashes generated by the hashing function.

At the end of the process, the system will have generated a plurality of file provenance signatures for the file.

Figure 3:
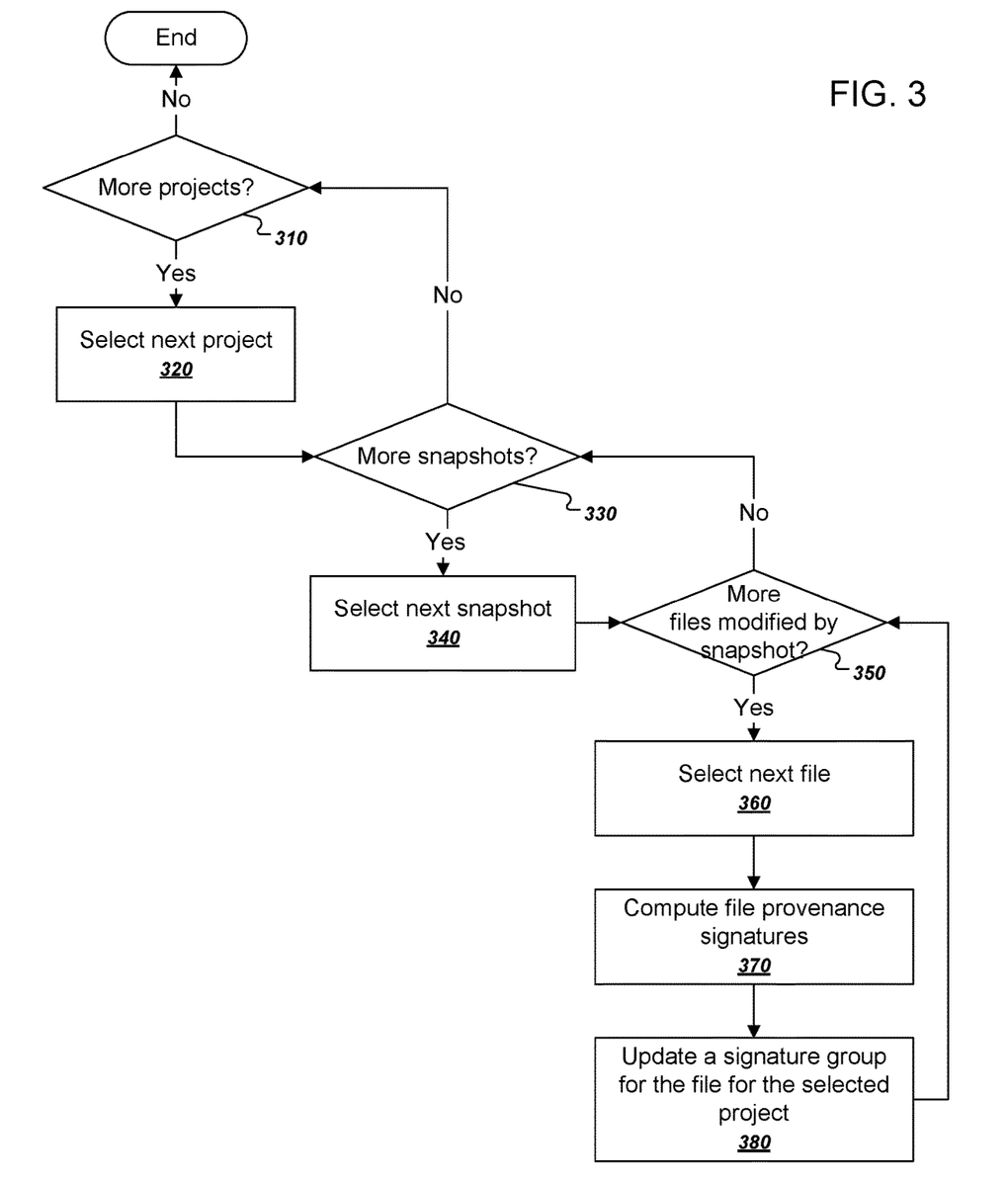
FIG. 3 is a flowchart of an example process for generating signature groups for files in a plurality of source code projects.

FIG. 3 is a flowchart of an example process for generating signature groups for files in a plurality of source code projects. The process will be described as being performed by an appropriately programmed system of one or more computers, e.g., the indexing engine 120 of FIG. 1.

The system determines whether more projects have yet to be processed (310). If so, the system selects a next project (branch to 320).

The system determines whether more snapshots for the selected project have yet to be processed (330). If not, the system again determines whether more projects have yet to be processed (branch to 310). If more snapshots for the selected project have yet to be processed, the system selects the next snapshot (branch to 340).

The system determines whether more files that were modified by the selected snapshot have yet to be processed (350). If not, the system again determines whether more snapshots for the selected project have yet to be processed (branch to 330). If more files that were modified by the selected snapshot have yet to be processed, the system selects a next file (branch to 360).

The system computes file provenance signatures for the selected file (370). For example, the system can use the processed described above with reference to FIG. 2.

The system updates a signature group for the selected file for the selected snapshot (380). A signature group is a set union of file provenance signatures that have ever been generated for any version of the file for the selected project. In other words, the system can maintain a single signature group for each file in the project.

The system can use file paths within the project to distinguish signature groups. In other words, each unique file path has a separate signature group. The system can also make the signature groups robust across file renames. This means that if a particular snapshot moves or renames a file, the system can associate the signature group with both file paths of the file. In order to keep track of the different names and locations of a file throughout the commit history of a project, the system can process the snapshots in chronological order and maintain, for each signature group, a current file path. Then, if a file is renamed or moved, the system can update the current file path for the signature group so that when the file is again encountered at the new path, the correct signature group is updated.

Each signature group is specific to a particular project. This means that if one project is copied from another, two files having identical file paths in the two projects will have different associated signature groups even though they have identical contents, identical file provenance signatures, and identical file paths.

Thus, the system can also maintain a relation that maintains a signature group for each file. The relation can for example have the following attributes: project identifier, file paths, file epoch, all file provenance signatures of the signature group for the file. Note that a file can have multiple file paths but only one project identifier. The file epoch is the date and time that the file was first committed to the project.

After updating the signature group for the file for the selected project, the system can optionally index the signature group inline each time the signature group is updated. Alternatively, the system can index the signature group once after it has been generated completely. Indexing a signature group is described in more detail below with reference to FIG. 4.

The system again determines whether more files modified by the selected snapshot have yet to be processed (350). If not, the system again determines whether more snapshots for the selected project have yet to be processed (branch to 330). If not, the system again determines whether more projects have yet to be processed (branch to 310). If not, the process ends (branch to end).

Figure 4:
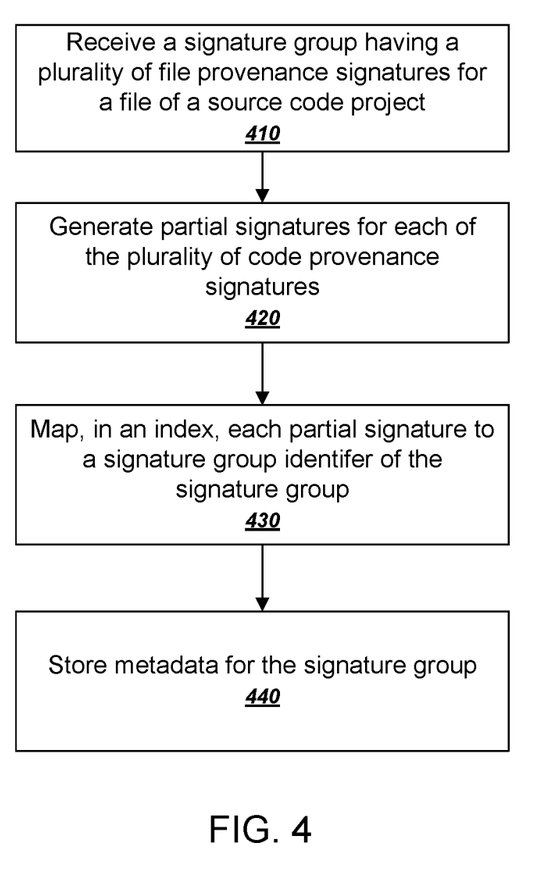
FIG. 4 is a flowchart of an example process for indexing a signature group.

FIG. 4 is a flowchart of an example process for indexing a signature group. In general, indexing a signature group involves associating each file provenance signature in the signature group with a signature group identifier. This allows for later searching by file provenance signature to identify a particular signature group identifier. The process will be described as being performed by an appropriately programmed system of one or more computers, e.g., the indexing engine 120 of FIG. 1.

The system receives a signature group having a plurality of file provenance signatures for a file of a source code project (410). As described above, the signature group is a set union of all file provenance signatures ever generated for all versions of a particular file in a source code project.

The system generates partial signatures for each of the plurality of file provenance signatures (420). Each partial signature is a proper subset of the full file provenance signature either in terms of bytes, e.g., Mbytes, or characters, e.g., M characters. The system can use any well-defined portion of a full file provenance signature, e.g., the beginning portion, a middle portion, or the end portion of the full file provenance signature.

The system maps, in an index, each partial signature to a signature group identifier of the signature group (430). For example, the system can generate a tuple in a table or a posting list for each encountered partial signature. Each tuple or posting list can then be associated with one or more signature group identifiers.

For example, to map each partial signature to a signature group identifier, the system can identify an existing posting list corresponding to the partial signature or generate a new one if the posting list does not exist. The system can then add the signature group identifier of the signature group as an element of the posting list.

The system can generate partial signatures from the full file provenance signatures in order to reduce the size of the index. For example, if the full file provenance signatures are 60-bit SHA-1 hashes, the system would potentially need to store up to $2^{160}$ elements in the index, which is intractable.

Instead, the system can use only partial signatures when populating the index. In some implementations, the system uses only the first few bytes of the file provenance signature as the partial signature. For example, using just two bytes results in up to only 65,536 elements in the index, three bytes results in up to approximately 16.7 million elements, and four bytes results in up to approximately 4.3 billion elements. Therefore, the size of the partial signature is a system parameter that can be tuned depending on needs of the system in terms of searching speed versus storage size.

Although using partial signatures makes collisions virtually certain, such collisions can be easily resolved using all file provenance signatures for a file. This is described in more detail below.

The system stores metadata for the signature group (440). In addition to storing the mapping between partial signatures and signature group identifiers, the system can also maintain a separate relation that is keyed by signature group identifier and which records metadata information for each signature group.

For example, the metadata information can include one or more of the following attributes: signature group identifier, epoch, first filename, project name, number of signatures.

The epoch and first filename record both the first date that the first was observed in the project and the filename that the file had at that time. This information can be used to indicate, to a user, that a particular file was first seen as the first filename at the date specified by the epoch.

The project name specifies the project corresponding to the signature group. As described above, each signature group is specific to a particular project. One example use of the project information is to prevent false positive designations of a file as library code. In particular, if a file was previously seen in the same project, the system generally will not identify the file as library code.

The number of signatures indicates the number of signatures in the signature group. This information can be used to determine when a particular file is a sufficient match for the signature group. In other words, signature groups having more signatures generally having a higher matching threshold than signature groups having fewer signatures.

TABLE 1 is an example index relation that maps each partial signature to one or more signature group identifiers. The partial signatures in TABLE 1 are represented as hexadecimal characters.

TABLE 1

| Partial Signature | Signature Group Identifiers |
| --- | --- |
| f36 | siggroup1, siggroup2 |
| 7a3 | siggroup300 |
| 6e4 | siggroup1, siggroup2, siggroup300 |
| 5ff | siggroup150, siggroup1 |

TABLE 2 is an example metadata relation that maps each signature group identifier to relevant metadata for the signature group.

TABLE 2

| Signature Group Identifier | Epoch | First Filename | Project | Number of Signatures |
| --- | --- | --- | --- | --- |
| siggroup1 | Jan. 1, 2007 | mycode.java | A | 18 |
| siggroup2 | Jun. 3, 2015 | copiedcode.java | B | 19 |
| siggroup150 | Jul. 4, 2011 | sample.java | C | 100 |
| siggroup300 | Aug. 18, 2012 | example.java | D | 200 |

As illustrated by TABLE 1, two partial signatures map to both of siggroup1 and siggroup2. This can be an indication that one file was copied from another. To determine which is which, the system can use the metadata relation in TABLE 2.

As shown in TABLE 2, siggroup1 corresponds to the file mycode.java, which was first committed to project A on Jan. 1, 2007. And siggroup2 corresponds to the file copiedcode.java, which was first committed to project B on Jun. 3, 2015.

If the signature groups for mycode.java and copiedcode.java have sufficient overlap, this is strong evidence that copiedcode.java was copied from mycode.java or a very similar file. In this case, the system can determine that copiedcode.java is library code rather than code that a developer wrote from scratch.

Figure 5:
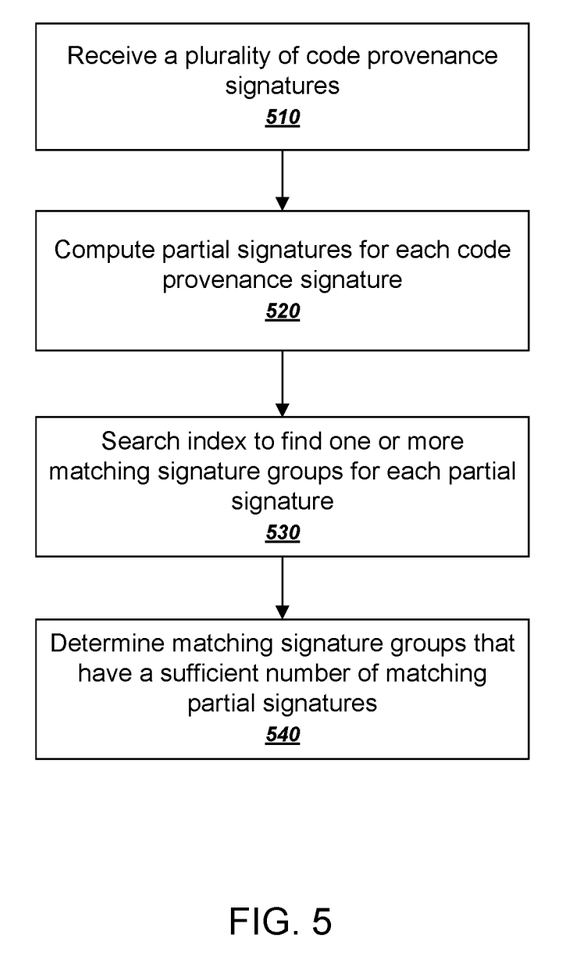
FIG. 5 is a flowchart of an example process for searching a file provenance index.

FIG. 5 is a flowchart of an example process for searching a file provenance index. The process will be described as being performed by an appropriately programmed system of one or more computers, e.g., the search engine 130 of FIG. 1.

The system receives a plurality of file provenance signatures (510). The file provenance signatures can either be computed from a file or provided as part of a signature group.

The system computes partial signatures for each file provenance signature (520). As described above, the system can compute each partial signature as a well-defined portion of each file provenance signature.

The system searches the index to find one or more candidate signature groups for each matching partial signature (530). The system determines which of the partial signatures are matching partial signatures that have entries in the index. For each matching partial signature, the system identifies one or more candidate signature groups. The system can for example identify a tuple or a posting list corresponding to each matching partial signature and identify a particular signature group identifier to which the index maps the partial signature.

The system determines matching signature groups having a sufficient number of matching partial signatures (540). In some implementations, the system identifies the matching signature groups as the candidate signature groups that were associated in the index with a least a threshold number of the partial signatures.

To use the example above, assume that signature group had the following signatures: f36P9beb62feec43f51, 6e45b0d0f6cd1fbf0bb, 5ff768a5cfb0a6f7b7d) and that the partial signatures use the first three bytes of the file provenance signatures (f36, 6e4, 5ff). In that case, the first row of TABLE 1 would be a hit for f36 and result in candidate signature groups (siggroup1, siggroup2). The third row of TABLE 1 would be a hit for 6e4 and result in candidate signature groups (siggroup1, siggroup2, siggroup150). And the fourth row of TABLE 1 would be a hit for 5ff and result in candidate signature groups (siggroup150, siggroup1).

In this example, siggroup1 had three matches for the given file provenance signatures, siggroup2 had two matches, and siggroup150 had only one match. In this example, if the threshold is three or more, the system can identify siggroup1 as a matching signature group. In contrast to this simple example, in practice, each file will typically be associated with many more, e.g., hundreds of file provenance signatures, and the threshold would typically be much higher as well.

The system can also consider the number of signatures in the metadata table to determine whether or not a candidate signature group is a matching signature group. For example, siggroup150 has 100 signatures, while siggroup1 has only 18 signatures. Therefore, the system can require more matches for siggroup150 than for siggroup1. In some implementations, the system computes the ratio of matching partial signatures to the number of signatures for a candidate signature group and compares the ratio to a threshold. For example, the system can require that the number of matching partial signatures be 50%, 75%, or 90%, of the number of signatures for a candidate signature group in order for the candidate signature group to be a matching signature group.

The above examples all determined matching signature groups by comparing match partial signatures. However, the system can also compare full file provenance signatures once the partial signatures are used to identify the candidate signature groups. In other words, a signature group can become a candidate signature group by virtue of having at least a threshold number of matching partial signatures. The system can then do a full comparison between full file provenance signatures for the file and each of the signature groups. The system can then only designate a signature group as a matching signature group if the signature group has a least a threshold number of matching file provenance signatures. And similar to the matching using partial signatures, the threshold for matching file provenance signatures can be a raw threshold count or can be based on a ratio of matches to total signatures in the signature group.

Figure 6:
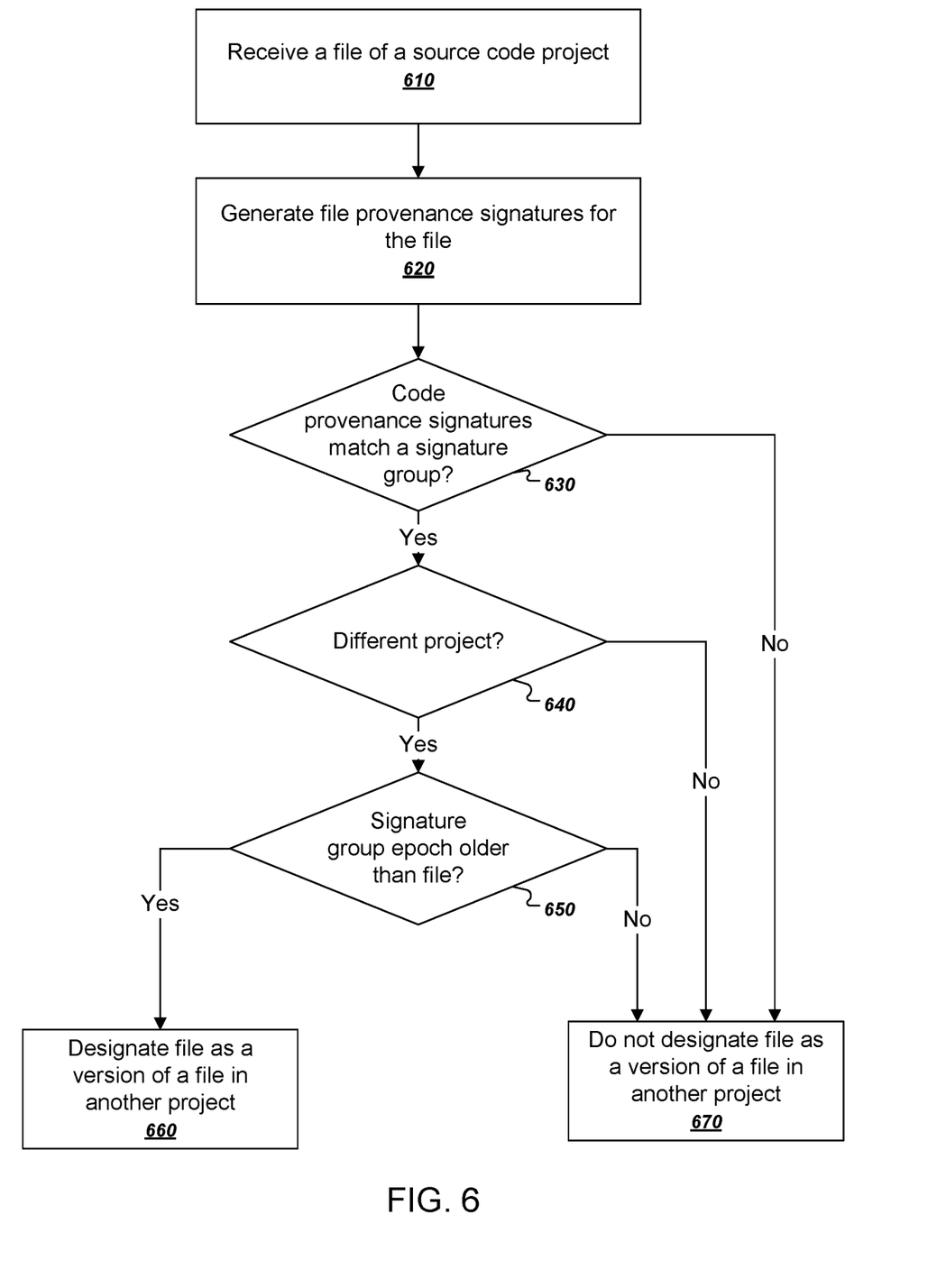
FIG. 6 is a flowchart of an example process for determining whether a file is a version of a file in another project.

FIG. 6 is a flowchart of an example process for determining whether a file is a version of a file in another project. The process will be described as being performed by an appropriately programmed system of one or more computers, e.g., the search engine 130 of FIG. 1.

The system receives a file (610).

The system generates file provenance signatures for the file (620). For example, the system can use the process as described above with reference to FIG. 2.

The system determines whether the file provenance signatures match a signature group (630). The system can use the example process as described above with reference to FIG. 5. That is, the system can generate partial signatures from the file provenance signatures. The system can then use the index to determine whether a sufficient number of the partial signatures match for a particular signature group.

If not, this means that no previously processed file had a matching signature group and the system does not designate the file as a version of a file in another project (branch to 670).

If one or more matching signature groups were identified, the system determines whether or not the any of the matching signature groups were for files in a different project (640). To do so, the system can consult a metadata relation that indicates, for each signature group, a project corresponding to the signature group. If none of the matching signature groups were for different projects, the system does not designate the file as a version of a file in another project (branch to 670).

If one or more of the matching signature groups were for files in a different project, the system determines whether the signature group epoch is older than the file (650). The system can consult the metadata table to identify the epoch for each of the matching signature groups. The system can then compute the epoch to a date for the file, which can be the date that the file was initially committed. In some implementations, the system uses the signature group identifier of the file to look up, in the metadata relation, an epoch for the file.

If none of the matching signature groups were older than the file, the system does not designate the file as version of a file in another project (branch to 670). In this instance, this can mean that all the other files of the matching signature groups copied from the file.

If at least one of the matching signature groups was older than the file, the system designates the file as a version of a file in another project (branch to 660).

When a searchable file provenance database as described above is implemented, a number of diverse and useful applications become possible. Many of these applications relate to technology inventory analysis, which includes techniques for discovering what source code exists in a particular code base. This information is particularly useful to senior managers of software projects, who often literally do not know what source code they have, where it came from, who wrote it, whether or not it is out of date, or whether or not it contains security vulnerabilities or other problems that require attention. Using a searchable file provenance database can augment the techniques for technology inventory analysis that are described in commonly owned U.S. patent application Ser. No. 15/476,578, for "External Dependency Attribution," which is herein incorporated by reference.

As one example, given a particular file, the system can identify a canonical source of the file. To do so, the system can determine which of the matching signature groups was the oldest. The system can then designate the file for the oldest matching signature group as being the canonical source of the file for being the earliest known origin of the file. This is often the project in which the file was actually written. And even if the canonical source is not literally the project in which the code was written, the canonical source can still provide useful information. For example, identifying the canonical source can still identify the original filename and the original project name of the file.

Once a canonical source is identified, the system can then iterate through all subsequent versions of the canonical source to identify a closest match to the file. This can be useful when the file has been renamed or portions of the file have been copied from other projects. To do so, the system can use the full file provenance signatures of the file and the full file provenance signatures generated for each subsequent version of the canonical source. The system can then designate the version having the most matches of full file provenance signatures as being the most likely version of the file. In this way, very precise version information can be obtained even for otherwise completely unidentifiable source code files and libraries and even if they have been renamed, moved, or otherwise modified substantially.

Another example includes classifying a source code file as library code. As described above, library code is code that is reused from another project rather than code that is written within a project. Without a searchable file provenance database, determining that code is library code is very difficult. For one thing, developers can rename files or use misleading naming conventions. Library files can also be put in unexpected places that do not look like library directories.

It can be quite useful to know that source code is library code. For example, the project developing the library may have a newer version that fixes bugs or security vulnerabilities. The developers of the project actually developing the library may have actually advertised the update, but if one does not even know that a source code file is library code, such information is useless. Thus, by knowing which files in a project are library code, developers of the project can actively look for updates or security vulnerabilities in those files.

A further extension of this technique is proactive notifications of library updates. In other words, once the system classifies a particular source code file as library code, the system can automatically check for new updates for the particular library. The system can then automatically provide a notification to a responsible entity for the project that an updated version of the library is available. This is very useful information for what may otherwise be a completely unidentified static source code file.

A still further extension is proactive monitoring of security vulnerabilities or other problems. For example, the system can maintain a list of library files that are known to have security vulnerabilities or other problems. Upon analyzing a particular project, the system can determine whether any file in the project is actually copied from a library file in the list. Upon making such a determination, the system can provide an automatic notification to a responsible entity for the project that the library code should be updated as soon as possible.

An example related to library code, already discussed above, is modification of attribution data. If a source code file actually has its origins in another project, e.g., if the source code file is library code, the system can decline to give credit to the developer entity who copied the file into the project. Similarly, the system can decline to blame the developer entity who copied the file into the project for any violations or other coding defects that may have been introduced in that source code file. Example performance metrics that can be affected by this technique include churn, net lines of code, violations introduced, violations removed, or net violations in the source code file.

Another example relates to adoption analysis. Adoption analysis seeks to determine, for a particular project, in which other projects the particular project is used. After compiling a searchable file provenance database, the system can automatically provide, to a responsible entity for each project, a list of other projects that have adopted code from the project.

Another example relates to detecting license term violations or illegally copied code. For example, the system can automatically identify when particular source code files or portions thereof originated in source code files having particular license terms. If the source code file having the copied data is in violation of the license terms, e.g., a requirement to include the license in the file header, the system can generate an automatic notification. This capability can be extremely useful for enterprises that want to be on the lookout for any developers that might be copying code from elsewhere without complying with the license terms of the code. Such activities expose organizations to great risk, but without a searchable file provenance database, there is no way to automatically identify such situations.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  receiving a portion of a file occurring in a source code project;
  computing, for each of a plurality of windows of characters in the portion of the file, a respective provenance signature;
  searching an index that maps each provenance signature to occurrences of the provenance signature in one or more files of a plurality of projects to identify one or more matching files that are each associated with at least one provenance signature computed for the portion of the file; and
  providing data identifying the one or more matching files in response to receiving the portion of the file occurring in the source code project.

Embodiment 2 is the method embodiment 1, wherein determining that one or more of the candidate signature groups are matching signature groups comprises:
  determining, for each candidate signature group, that the number of matching partial signatures or matching file provenance signatures between the source code file and the candidate signature group satisfies a threshold.

Embodiment 3 is the method of any one of embodiments 1-2, wherein determining that one or more of the candidate signature groups are matching signature groups comprises:
  determining, for each candidate signature group, that a ratio of a number of matching partial signatures or matching file provenance signatures to a total number of signatures in the candidate signature group satisfies a threshold.

Embodiment 4 is the method of any one of embodiments 1-3, wherein the operations further comprise:

determining which of the matching signature groups is associated with an oldest file among files associated with the matching signature groups; and designating an oldest particular file associated a matching signature group as being a canonical source of the source code file.

Embodiment 5 is the method of embodiment 4, further comprising:

identifying a plurality of subsequent versions of the canonical source;

determining which of the subsequent versions has the most matching file provenance signatures with the source code file; and designating a particular version having the most matching file provenance signatures with the source code file as a most likely version of the source code file.

Embodiment 6 is the method of any one of embodiments 1-5, further comprising:

receiving a request to attribute a plurality of performance metrics to a developer entity responsible for the source code file;

removing a contribution of the source code file from the performance metrics; and attributing a remainder of the performance metrics to the developer entity responsible for the source code file.

Embodiment 7 is the method of embodiment 6, wherein the performance metrics include one or more of churn, net lines of code, violations introduced, violations removed, or net violations in the source code file.

Embodiment 8 is the method of any one of embodiments 1-7, further comprising:

designating the source code file as library code that was previously introduced in one or more other software projects.

Embodiment 9 is the method of embodiment 8, further comprising:

identifying a library version corresponding to the source code file;

determining that a newer library version is available; and providing an automatic notification to a responsible entity of the particular project that a newer version of the library code is available.

Embodiment 10 is the method of embodiment 8, further comprising:

maintaining a list of library files having a known vulnerability;

determining that the source code file is copied from a library file occurring in the list of library files having a known vulnerability; and providing an automatic notification to a responsible entity of the particular project that the source code file has a known vulnerability.

Embodiment 11 is the method of any one of embodiments 1-10, wherein the operations further comprise:

identifying, for a particular project, a number of other projects in which code from the particular project has been adopted; and providing, to a responsible entity for the particular project, an automatic notification identifying one or more of the other projects in which code from the particular project has been adopted.

Embodiment 12 is a system comprising: one or more computers and one or more storage devices storing instructions that are operable, when executed by the one or more computers, to cause the one or more computers to perform the method of any one of embodiments 1 to 11.

Embodiment 13 is a computer storage medium encoded with a computer program, the program comprising instructions that are operable, when executed by data processing apparatus, to cause the data processing apparatus to perform the method of any one of embodiments 1 to 11.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising:
one or more computers and one or more storage devices storing instructions that are operable, when executed by the one or more computers, to cause the one or more computers to perform at least the following:
receive a portion of a file occurring in a source code project;
define a plurality of windows of characters within the portion of the file, wherein each window of characters of the plurality of windows of characters is defined based on one or more anchor characters, the one or more anchor characters comprising one or more reserved source code characters, and wherein each window of characters comprises an anchor character of the one or more anchor characters and a predefined number of characters at one or more particular character offsets from the anchor character;
compute, for each of the plurality of windows of characters of one or more source code segments in the portion of the file, a respective provenance signature by using each window of characters as input to a content-based signature function that generates each provenance signature as a fixed-size output for any arbitrarily sized input;

search an index that maps each provenance signature to occurrences of the provenance signature in one or more files of a plurality of projects to identify one or more matching files that are each associated with at least one provenance signature computed for the portion of the file; and provide data identifying the one or more matching files in response to receiving the portion of the file occurring in the source code project.

2. The system of claim 1, wherein identifying one or more matching files comprises determining that one or more candidate signature groups are matching signature groups by determining, for each candidate signature group, that a number of matching partial signatures or matching file provenance signatures between the source code file and the candidate signature group satisfies a threshold.

3. The system of claim 1, wherein determining that the one or more candidate signature groups are matching signature groups comprises:

determining, for each candidate signature group, that a ratio of a number of matching partial signatures or matching file provenance signatures to a total number of signatures in the candidate signature group satisfies a threshold.

4. The system of claim 1, wherein the instructions are further operable to cause the one or more computers to:

determine which of the matching signature groups is associated with an oldest file among files associated with the matching signature groups; and designate an oldest particular file associated a matching signature group as being a canonical source of the source code file.

5. The system of claim 4, wherein the instructions are further operable to cause the one or more computers to:

identify a plurality of subsequent versions of the canonical source;

determine which of the subsequent versions has the most matching file provenance signatures with the source code file; and designate a particular version having a highest number of matching file provenance signatures with the source code file as a most likely version of the source code file.

6. The system of claim 1, wherein the instructions are further operable to cause the one or more computers to:

receive a request to attribute a plurality of performance metrics to a developer entity responsible for the portion of the file occurring in the source code project;

remove a contribution of the portion of the file occurring in the source code project that is associated with the one or more matching files from the performance metrics; and attribute a remainder of the performance metrics to the developer entity responsible for the portion of the file occurring in the source code project.

7. The system of claim 6, wherein the performance metrics include one or more of churn, net lines of code, violations introduced, violations removed, or net violations in the source code file.

8. The system of claim 1, wherein the instructions are further operable to cause the one or more computers to:

designate the source code file as library code that was previously introduced in one or more other software projects.

9. The system of claim 8, wherein the instructions are further operable to cause the one or more computers to:

identify a library version corresponding to the source code file;

determine that a newer library version is available; and provide an automatic notification to a responsible entity of the particular project that a newer version of the library code is available.

10. The system of claim 8, wherein the instructions are further operable to cause the one or more computers to:

maintain a list of library files having a known vulnerability;

determine that the source code file is copied from a library file occurring in the list of library files having a known vulnerability; and provide an automatic notification to a responsible entity of the particular project that the source code file has a known vulnerability.

11. The system of claim 1, wherein the instructions are further operable to cause the one or more computers to:

identify, for a particular project, a number of other projects in which code from the particular project has been adopted; and provide, to a responsible entity for the particular project, an automatic notification identifying one or more of the other projects in which code from the particular project has been adopted.

12. The system of claim 1, wherein the content-based signature function is a content-based hashing function.

13. The system of claim 1, wherein the predefined number of characters is ten or more characters.

14. A computer-implemented method comprising:

receiving a portion of a file occurring in a source code project;

defining a plurality of windows of characters within the portion of the file, wherein each window of characters of the plurality of windows of characters is defined based on one or more anchor characters, the one or more anchor characters comprising one or more reserved source code characters, and wherein each window of characters comprises an anchor character of the one or more anchor characters and a predefined number of characters at one or more particular character offsets from the anchor character;

computing, for each of the plurality of windows of characters of one or more source code segments in the portion of the file, a respective provenance signature by using each window of characters as input to a content-based signature function that generates each provenance signature as a fixed-size output for any arbitrarily sized input;

searching an index that maps each provenance signature to occurrences of the provenance signature in one or more files of a plurality of projects to identify one or more matching files that are each associated with at least one provenance signature computed for the portion of the file; and providing data identifying the one or more matching files in response to receiving the portion of the file occurring in the source code project.

15. The method of claim 14, wherein identifying one or more matching files comprises determining that one or more candidate signature groups are matching signature groups by determining, for each candidate signature group, that the number of matching partial signatures or matching file provenance signatures between the source code file and the candidate signature group satisfies a threshold.

16. The method of claim 14, wherein determining that the one or more candidate signature groups are matching signature groups comprises:
   determining, for each candidate signature group, that a ratio of a number of matching partial signatures or matching file provenance signatures to a total number of signatures in the candidate signature group satisfies a threshold.

17. The method of claim 14, further comprising:
   determining which of the matching signature groups is associated with an oldest file among files associated with the matching signature groups; and
   designating an oldest particular file associated a matching signature group as being a canonical source of the source code file.

18. The method of claim 17, further comprising:
   identifying a plurality of subsequent versions of the canonical source;
   determining which of the subsequent versions has the most matching file provenance signatures with the source code file; and
   designating a particular version having a highest number of matching file provenance signatures with the source code file as a most likely version of the source code file.

19. The method of claim 14, further comprising:
   receiving a request to attribute a plurality of performance metrics to a developer entity responsible for the portion of the file occurring in the source code project;
   removing a contribution of the portion of the file occurring in the source code project that is associated with the one or more matching files from the performance metrics; and
   attributing a remainder of the performance metrics to the developer entity responsible for the portion of the file occurring in the source code project.

20. The method of claim 19, wherein the performance metrics include one or more of churn, net lines of code, violations introduced, violations removed, or net violations in the source code file.

21. The method of claim 14, further comprising:
   designating the source code file as library code that was previously introduced in one or more other software projects.

22. The method of claim 21, further comprising:
   identifying a library version corresponding to the source code file;
   determining that a newer library version is available; and
   providing an automatic notification to a responsible entity of the particular project that a newer version of the library code is available.

* * * * *